United States Patent [19]

Brown

[11] Patent Number: 4,951,965
[45] Date of Patent: Aug. 28, 1990

[54] VEHICLE SEAT BELT RETAINER FOR A CHILD

[75] Inventor: Gregory Brown, Alberta, Canada

[73] Assignee: Innovations International Trading Corporation, Canada

[21] Appl. No.: 223,235

[22] Filed: Jul. 22, 1988

[51] Int. Cl.$^5$ ............................................. B60R 22/02
[52] U.S. Cl. ..................................... 280/801; 297/468
[58] Field of Search .................... 280/801, 748, 751; 297/464, 467, 468, 466, 485, 473, 255; 2/319, 314

[56] References Cited

U.S. PATENT DOCUMENTS 4,706,992  11/1987  Downing et al. .................... 280/801
4,741,574   5/1988  Weightman et al. ................ 280/801

FOREIGN PATENT DOCUMENTS 2839141  3/1980  Fed. Rep. of Germany ...... 297/468
3231263  2/1984  Fed. Rep. of Germany ...... 297/468
3519346  12/1986  Fed. Rep. of Germany ...... 280/801
2539287  7/1984  France ................................. 297/468

Primary Examiner—Charles A. Marmor
Assistant Examiner—Karin Tyson
Attorney, Agent, or Firm—Kane, Dalsimer, Sullivan, Kurucz, Levy, Eisele and Richard

[57] ABSTRACT

The present invention comprises a vehicle seat belt retainer for a child. The retainer comprises a strap to circumscribe the child's lower buttocks from the child's lap when the child is in seated position in a vehicle. The strap is attached to means releasably securable to a lap belt of a conventional vehicle seat belt and adjustable in operative length. The strap is provided with means for releasably securing the strap in position about the child. The retainer holds the child in position while at the same time positions the lap belt properly, with respect to the child, to thereby minimize seat belt induced injuries to the child in case of a vehicle accident.

11 Claims, 1 Drawing Sheet

VEHICLE SEAT BELT RETAINER FOR A CHILD

BACKGROUND OF THE INVENTION

The present invention relates to a vehicle seat belt retainer for a child, and more particularly relates to such a retainer which may be quickly and easily added to the conventional seat belt restraint system of a vehicle.

Conventional vehicle seat belts which consist of a shoulder/lap belt combination, are often not entirely satisfactory as safety restraints for children. In particular, children over the age of five or weighing over eighteen kilograms, who can wear a regular lap belt or shoulder/lap belt combination, until approximately the age of eleven, have not fully developed pelvises. Care must therefore be taken to prevent the lap belt from moving up off the pelvic bones and applying pressure to the abdomen. When this occurs under impact (known as "submarining"), serious internal organ and/or spinal cord injuries may result. The prominent bony structure of the adult pelvis readily holds the lap belt in place. It is important, therefore, and particularly with children, that the lap belt should be properly positioned initially, and held securely over the pelvis while the lap belt is being worn.

Shoulder/lap belt combination systems, while normally safer for children than lap belts alone, may, under impact conditions, have a negative effect on the positioning of the lap belt section. This is because most shoulder/lap belt combination restraints are a one piece belt system with a loop and buckle assembly attached. Because of the weight and leverage of the upper body in comparison to the lower body, the shoulder belt is usually subject to more strain under initial impact than the lap belt. As a result this may produce submarining by causing the shoulder belt to pull the lap belt and buckle assembly up into the abdominal area.

These problems of properly positioning conventional seat belts may be further enhanced by the normal activity of children who may tend to move around or slump down in their seat in the vehicle.

Attachments to conventional vehicle seat belts to improve their comfort and performance are known. For example, U.S. Pat. No. 3,957,282 of Finnigan issued May 18, 1976 describes and illustrates an attachment for a shoulder harness comprising a soft resilient material embracing the shoulder belt and providing a cushioned surface which enlarges as pressure is applied to it in the vicinity of the neck of the wearer. This device blunts the edge of the belt as it is urged towards the neck of the wearer. It is detachable from existing shoulder harnesses. U.S. Pat. No. 4,619,468 of Spill issued Oct. 28, 1986 describes and illustrates a cover for a shoulder/lap belt combination consisting of a pair of tubular sleeve members with longitudinal slits therein so that they may be opened and wrapped around the lap in diagonal straps respectively. The sleeve members include an inner surface formed of a pile fabric material. Other padded seat belts are described and illustrated in U.S. Pat. Nos. 4,192,530 of Cachia issued Mar. 11, 1980 and U.S. Pat. No. 3,804,461 of Kienel issued Apr. 16, 1974.

It is an object of the present invention to provide a vehicle seat belt retainer for a child which will help reduce the risk of internal and/or spinal cord injuries associated with conventional vehicle lap belt or shoulder/lap belt combination systems. It is a further object of the present invention to provide such a device which may be quickly and easily installed on a vehicle's existing lap belt or shoulder/lap belt restraint system.

SUMMARY OF THE INVENTION

In accordance with the present invention there is provided a vehicle seat belt retainer for a child comprising a strap is attached to means releasably securable to a lap belt of a conventional vehicle seat belt and adjustable in operative length. The strap is attached to said means so as to circumscribe the child's lower buttocks from the child's lap when the child is in seated position under the lap belt in the vehicle, and thereby assist in maintaining the lap belt in position on the child. The strap is further provided with means for releasably securing the strap in circumscribing position about the child.

In a preferred embodiment the strap comprises a belt section having ends to which are secured releasable clip means. Co-operating releasable clip means are secured to the means releasably securable to the lap belt for releasably securing the belt section in position about the child. The flexible sleeve preferably comprises a fabric strip with means secured thereto for co-operating with other means secured thereto for releasably securing that strip, in position wrapped about the vehicle lap belt against unpurposeful disengagement. The sleeve preferably is additionally provided with a means secured thereto for co-operating with other means secured thereto for releasably securing that strip, when wrapped about the vehicle lap belt in position against unpurposeful disengagement.

The seat belt retainer in accordance with the present invention not only helps to position the vehicle lap belt properly on the child's pelvis while the child is wearing the retainer, it also assists in holding the lap belt in that proper position under impact conditions or while the child may be moving around on the seat.

BRIEF DESCRIPTION OF THE DRAWINGS

These and other objects and advantages of the invention will become apparent upon reading the following detailed description and upon referring to the drawings in which.

Figure 1:
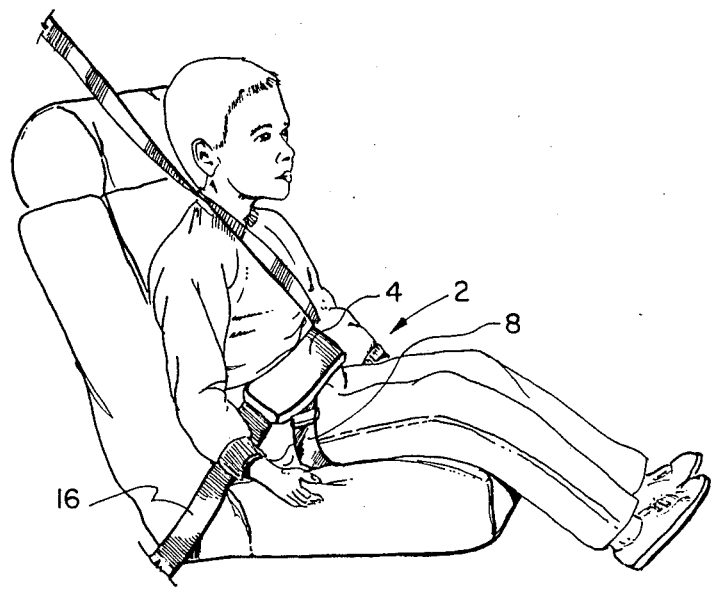
FIG. 1 is a perspective view of a vehicle seat belt retainer in accordance with the present invention in position on a child seated in a vehicle.
Figure 2:
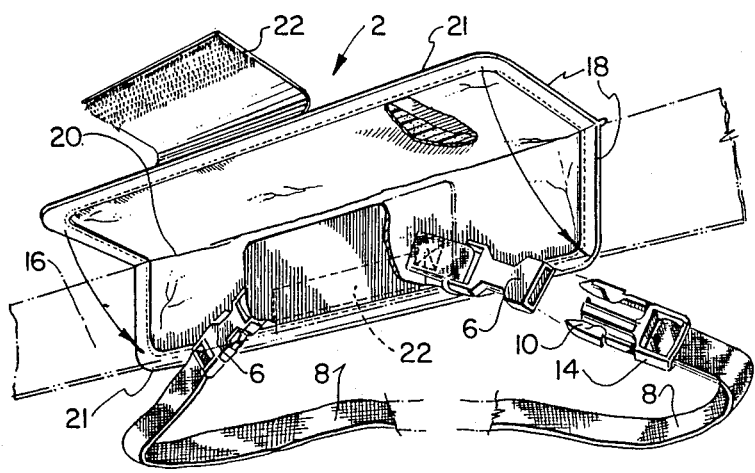
FIG. 2 is a perspective view of the retainer of FIG. 1 in open, seat belt-receiving position.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1 there is illustrated a child, seated in a vehicle, wearing a seat belt retainer 2 in accordance with the present invention. Retainer 2 comprises generally a sleeve 4 to which are secured by any appropriate means, at spaced intervals, female buckle mechanisms 6. At the ends of belt section 8 are positioned co-operating male buckle mechanisms 10. The length of belt section may be appropriately adjusted by conventional adjustment means 14 associated with buckle mechanisms 10.

Sleeve 4 is constructed so that it may be releasably and securely fastened about conventional lap belt 16. In the illustrated embodiment, it is made of padded fabric strips 18 which are secured together along one side 20, but free to open along the other side 21. Securing means 22 in the form of snaps, hook and pile retainers or the like, are secured to the strips along their open sides 21 so that these strips may be releasably secured about lap belt 16. In other words padded strips 18 co-operate together to form releasable flaps which may receive and retain within, lap belt 16 against unpurposeful disengagement when the flaps are secured in position by means of securing means 22. At the ends of sleeve 4 may be provided, if required, releasable friction clips (not illustrated) for gripping both lap belt 16 and sleeve 4 to maintain the two in proper relative position.

It will be understood that the sleeve 4 and belt section 8 are provided with dimensions such that straps 18 of the sleeve will circumscribe lap belt 16, when in position thereon, and belt section 8 secured to sleeve 4 will circumscribe the child's lower buttocks when the child is in seated position in the vehicle (FIG. 1) when buckle mechanisms 6 and 10 are in closed, securing position.

In operation, sleeve 4 is fitted about lap belt 16 by placing the lap belt within the opening formed when strips 18 are open along sides 21. The padded strips 18 are then closed and secured together along sides 21 by means of securing means 22. Belt section 8, forming a supplementary belt or strap, is wrapped around and under the lower buttocks of the child and then its length adjusted, using adjustment means 14, for a firm but comfortable hold. When installed and used correctly, the retainer 2 in accordance with the present invention ensures correct initial positioning of lap belt 16 and will help maintain it in that position on the child. In the event of a collision or impact, retainer 2 can thereby hold lap belt 16 in the proper position on a child (with respect to the child's pelvis) and reduce the possibility of injury to that child.

In addition, retainer 2 in accordance with the present invention provides increased comfort to the child by preventing the lap belt 16 from riding high on the child's pelvis and by distributing the force of impact more evenly over the child's body. The padding provided in sleeve 4 provides additional comfort.

While the retainer in accordance with the present invention has been primarily designed for children of ages five to eleven, it is very adaptable to a wide range of age and size of users. For example, by providing a sleeve 4 and belt section 8 with proper dimensions and positioning, the retainer 2 can be used by adults such as pregnant women wishing to take special care protecting themselves and their unborn child. It can also be used, with appropriate modification, with some models of booster seats.

Thus it is apparent that there has been provided in accordance with the invention a vehicle seat belt retainer for a child that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A vehicle seat belt retainer for a child comprising a strap, means releasably securable to a lap belt of a conventional vehicle seat belt for attaching the strap to the lap belt, said strap adjustable in circumscribing the child's lower buttocks from the child's lap when the child is in seated position under the lap belt in the vehicle and thereby maintaining the lap belt in position about the child, the strap comprising a belt section having ends, both of which are attached to said means releasably securable to the lap belt, at least one of which is secured to releasable clip means, and co-operating releasable clip means secured to the means releasably securable to the lap belt, the belt section for releasably securing the lap belt in position about the child.

2. A retainer according to claim 1 wherein the belt section is provided with means adjusting its operative length so that the strap, when the clip means are in operative position, will fit snugly in position about the child.

3. A retainer according to claim 2 wherein the co-operating clip means comprise co-operating male and female buckle assemblies.

4. A retainer according to claim 2 wherein the means releasably securable to the lap belt comprises a flexible sleeve.

5. A retainer according to claim 4 wherein the flexible sleeve comprises a fabric strip with means secured thereto for co-operating with other means secured thereto for releasably securing that strip, when wrapped about the vehicle lap belt, in position against unpurposeful disengagement.

6. A retainer according to claim 5 wherein the means secured to the strap comprise hook and pile fabric retainer means.

7. A retainer according to claim 1 wherein the co-operating clip means comprise co-operating male and female buckle assemblies.

8. A retainer according to claim 1 wherein the means releasably securable to the lap belt comprises a flexible sleeve.

9. A retainer according to claim 8 wherein the sleeve is made of fabric and padded where it would normally come in contact with the child.

10. A retainer according to claim 8 wherein the flexible sleeve comprises a fabric strip with means secured thereto for co-operating with other means secured thereto for releasably securing that strip, when wrapped about the vehicle lap belt, in position against unpurposeful disengagement.

11. A retainer according to claim 10 wherein the means secured to the strip comprise hook and pile fabric retainer means.

* * * * *